United States Patent
Kinoshita

(10) Patent No.: US 8,724,165 B2
(45) Date of Patent: May 13, 2014

(54) IMAGE DATA GENERATING DEVICE, IMAGE DATA GENERATING METHOD, AND COMPUTER-READABLE STORAGE MEDIUM FOR GENERATING MONOCHROME IMAGE DATA AND COLOR IMAGE DATA

(75) Inventor: Koji Kinoshita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1441 days.

(21) Appl. No.: 12/128,313

(22) Filed: May 28, 2008

(65) Prior Publication Data
US 2008/0309960 A1 Dec. 18, 2008

(30) Foreign Application Priority Data
Jun. 18, 2007 (JP) .................................. 2007-160261

(51) Int. Cl.
- G06F 15/00 (2006.01)
- G06K 1/00 (2006.01)
- G06F 3/12 (2006.01)
- G06K 9/00 (2006.01)
- G06K 9/38 (2006.01)

(52) U.S. Cl.
USPC ............ 358/1.9; 358/1.13; 382/181; 382/176

(58) Field of Classification Search
None
See application file for complete search history.

(56) References Cited

U.S. PATENT DOCUMENTS

| | | | | |
|---|---|---|---|---|
| 5,930,410 A | * | 7/1999 | Webb et al. | 382/312 |
| 6,115,482 A | * | 9/2000 | Sears et al. | 382/114 |
| 6,366,696 B1 | * | 4/2002 | Hertz et al. | 382/183 |
| 6,519,362 B1 | * | 2/2003 | Cusmariu | 382/176 |
| 2002/0052888 A1 | * | 5/2002 | Sellen et al. | 707/500 |
| 2003/0142358 A1 | * | 7/2003 | Bean et al. | 358/3.28 |
| 2004/0139164 A1 | * | 7/2004 | Kanaya | 709/206 |

FOREIGN PATENT DOCUMENTS

| | | |
|---|---|---|
| JP | 10-340273 | 12/1998 |
| JP | 2004-17538 | 1/2004 |
| JP | 2005-39666 | 2/2005 |
| JP | 2007-41709 | 2/2007 |

OTHER PUBLICATIONS

Office Action mailed Jun. 28, 2011, in Japanese Patent Application No. 2007-160261, filed Jun. 18, 2007 (English language translation).

* cited by examiner

Primary Examiner — Ming Hon
(74) Attorney, Agent, or Firm — Oblon, Spivak, McClelland, Maier & Neustadt, L.L.P.

(57) ABSTRACT

An image data generating device includes an original image acquirer that acquires original image data of a subject. The image data generating device also includes a controller that generates image data. The controller includes a monochrome image data generator that generates monochrome image data from the original image data. The controller also includes a color image data generator that generates color image data from the original image data. Further, the controller includes a text data acquirer that acquires recognition result data from the monochrome image data generated by the monochrome image data generator. In addition, the controller includes a recording unit that associates and records the color image data generated by the color image data generator and the recognition result data acquired by the text data acquirer.

5 Claims, 3 Drawing Sheets

IMAGE DATA GENERATING DEVICE, IMAGE DATA GENERATING METHOD, AND COMPUTER-READABLE STORAGE MEDIUM FOR GENERATING MONOCHROME IMAGE DATA AND COLOR IMAGE DATA

BACKGROUND OF THE INVENTION

1. Field of the Invention

The present invention relates to an image data generating device, an image data generating method, and a computer-readable storage medium.

2. Description of the Related Art

In order to accurately convert paper-based media to electronic data, technology is being investigated that uses a machine-readable barcode to print a document while maintaining the security of information such as personal information or information related to the filename or another identifier (for example, see Unexamined Japanese Patent Application KOKAI Publication No. 2004-17538, pg. 1). In Unexamined Japanese Patent Application KOKAI Publication No. 2004-17538, personal information is barcode-converted into a personal information barcode, and logo barcode information is then generated by combining this barcode with logo data. The logo barcode information is then merged with print data to generate logo print data, which is then printed. When converting this printed document having barcode printed thereon to electronic data, the machine-readable filename or other identifier is obtained during scanning. In doing so, association with incorrect information is avoided.

At the same time, there exists a technology that generates both color image data and monochrome image data from the same subject document (for example, see Unexamined Japanese Patent Application KOKAI Publication No. 2005-39666, pg. 1, and Unexamined Japanese Patent Application KOKAI Publication No. 10-340273, FIG. 1).

In the invention disclosed in Unexamined Japanese Patent Application KOKAI Publication No. 2005-39666, a controller determines from a pixel tolerance level whether data is a monochrome image or a color image. In the case of a monochrome image, the data is converted into a monochrome file (1 bit per pixel). In the case of a color image, the data is converted into a grayscale file (8 bits per pixel). Since data is saved in a 1-bit or 8-bit format depending on whether the data is a monochrome image or a color image, less space is required to save image files.

In the technology disclosed in Unexamined Japanese Patent Application KOKAI Publication No. 10-340273, a location to be displayed is identified by a monochrome map obtained from a monochrome image scanner. Additionally, a map for display including this location is generated by combining the monochrome map with a color map obtained from a color image scanner. The combined map is then displayed on a CRT.

In Unexamined Japanese Patent Application KOKAI Publication No. 2005-39666 and Unexamined Japanese Patent Application KOKAI Publication No. H10-340273 described above, data for one color image or one monochrome image is generated during a single scan. Thus, it was necessary to scan twice in order to obtain both monochrome image data and color image data.

However, there is a method to obtain both a color image and a monochrome image from a single scan. In this case, first color image data is generated, and then a monochrome image is generated from the generated color image data. However, the color image data is generated using a non-reversible (lossy) compression processing, such as JPEG. Thus, the monochrome image generated from the color image data has indistinct edges compared to the case wherein an image is scanned to generate monochrome image data. Consequently, when conducting information recognition processing using a monochrome image displayed from color image data, the recognition ratio was low, and obtaining correct information was difficult.

SUMMARY OF THE INVENTION

The present invention, being devised in the light of the foregoing, provides an image data generating device, an image data generating method, and an image data generating program that efficiently acquires more accurate recognition result data and generates color image data associated with this recognition result data.

An image data generating device in accordance with a first aspect of the present invention that solves the above problems comprises an original image acquirer that acquires original image data of a subject, and a controller that generates image data. The controller includes a monochrome image data generator that generates monochrome image data from the original image data, as well as a color image data generator that generates color image data from the original image data.

In the image data generating device, the original image acquirer may also include a scanner controller that scans a subject while at the same time converting reflected light from the subject into an electrical signal, the scanner controller subsequently generating original image data from this electrical signal.

In the image data generating device, the controller may include a text data acquirer that acquires recognition result data from the monochrome image data generated by the monochrome image data generator, as well as a recording unit that associates and records the color image data generated by the color image data generator and the recognition result data acquired by the text data acquirer.

In the image data generating device, the recording unit may also generate and record image data for saving that includes both the recognition result data acquired by the text data acquirer and the color image data generated by the color image data generator.

Furthermore, an image data generating method in accordance with another aspect of the present invention is a method for generating image data, using an image data generating device comprising an original image acquirer that acquires original image data and controller having a monochrome image data generator and a color image data generator. The method includes the steps of the monochrome image data generator generating monochrome image data from the original image data and the color image data generator generating color image data from the original image data.

In addition, a computer-readable storage medium in accordance with another aspect of the present invention is a computer-readable storage medium that stores a program causing a computer to function as an original image acquirer that acquires original image data of a subject and also to function as a controller. The program causes the controller to function as a monochrome image data generator that generates single-color image data from the original image data, as well as a color image data generator that generates color image data from the original image data.

According to the present invention, a controller generates a monochrome image and a color image from the original image data. Hence, recognition result data is more accurately acquired from the monochrome image, and it becomes possible to associate more accurate recognition result data to the color image.

According to the present invention, the controller scans a subject, while converting reflected light from the subject into an electrical signal. Subsequently, the controller generates a single set of original image data from the converted electrical signal, and from this original image data, generates monochrome image data and color image data. Since monochrome image data of the original image data can also be acquired with a single scan, more accurate recognition result data can be efficiently acquired.

According to the present invention, the controller acquires recognition result data from the monochrome image that was generated from the original image data. Since the monochrome image is generated from the original image data, an image with sharply-defined edges is obtained, without the blurred lines present in monochrome images generated from a color image which has been subject to color separation and compression. For this reason, the recognition result data acquired from the generated monochrome image can be recognized at a higher rate. Consequently, this recognition result data can be more accurately associated with the color image data. Moreover, since the controller generates both monochrome image data and color image data from a single set of original image data, this process is conducted efficiently.

According to the present invention, an image file for saving is generated that includes both the recognition result data as well as the color image data. In this way, since recognition result data can be associated with color image data without human intervention, recognition result data can be accurately associated with color image data.

According to the present invention, accurate recognition result data is efficiently acquired, enabling this recognition result data to be associated with color image data.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

Hereinafter, a concrete embodiment of the present invention will be described with reference to FIGS. 1 and 2.

Figure 1:
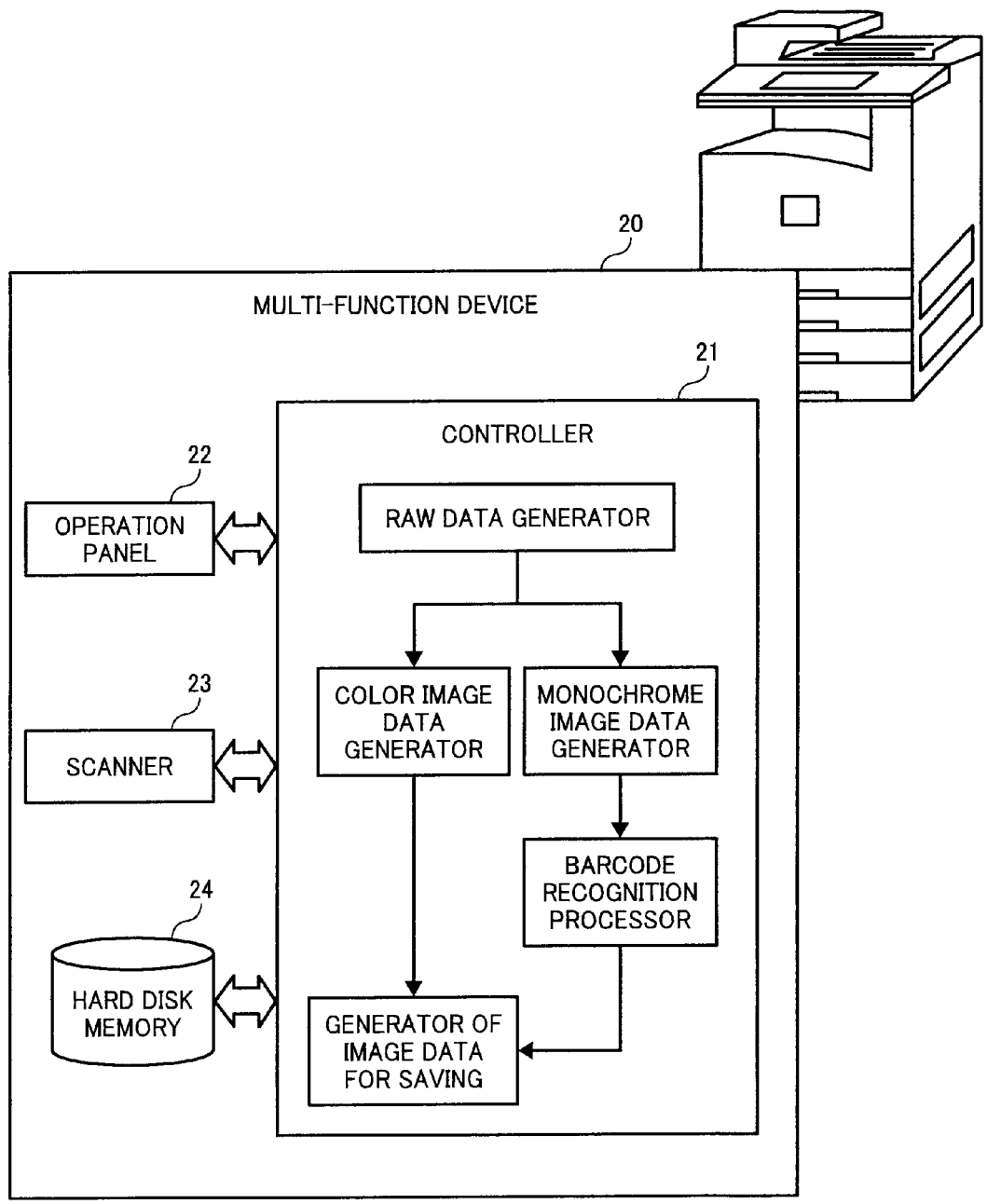
FIG. 1 is a block diagram illustrating the configuration of an image data generating device in accordance with an embodiment of the present invention.

The multi-function device 20 (i.e., an example of an image data generating device of the claimed invention) shown in FIG. 1 is provided with scanner functions. More specifically, the multi-function device 20 is provided with a controller 21, an operation panel 22, a scanner 23, and a hard disk memory 24.

Figure 3:
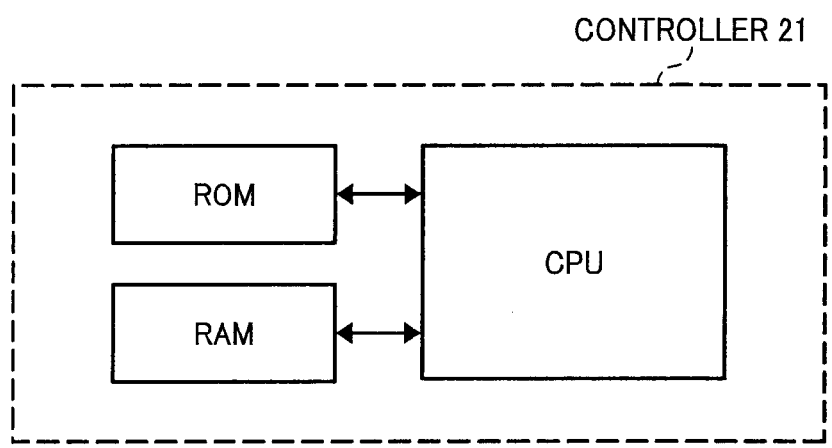
FIG. 3 is a block diagram illustrating the configuration of a controller of the multi-function device.

The controller 21 includes components such as a CPU, RAM, and ROM as shown in FIG. 3. CPU is connected to each of the above mentioned components of the multi-function device 20 and exchanges data and control signals with the respective components in order to control the operation of the multi-function device 20 as a whole. ROM stores, for example, Operating System and other programs needed to operate the multi-function device 20. RAM serves as a work area for temporarily storing data and other information for later use.

The controller 21 conducts processes to be hereinafter described (such processes including RAW data generation, color image data generation, monochrome image data generation, barcode recognition, and generation of image data for saving). Furthermore, by executing an image data generation program provided for the purpose of conducting the above processes, the controller 21 functions as a RAW data generator, a monochrome image data generator, a color image data generator, a barcode recognition processor, as well as a generator of image data for saving.

The RAW data generator (i.e., an example of an original image acquirer of the claimed invention) generates original image data (RAW data) acquired using the imaging element of the scanner 23. This RAW data is unprocessed data acquired from the imaging element of the scanner 23.

The monochrome image data generator uses the RAW data to generate monochrome image data in a predetermined file format. In the present embodiment, lossless (reversible conversion) TIFF (Tagged Image File Format) is used as the predetermined file format.

The color image data generator uses the RAW data to generate color image data in a predetermined file format. In the present embodiment, lossy JPEG (Joint Photographic Experts Group) is used as the predetermined file format.

The barcode recognition processor (i.e., an example of a text data acquirer of the claimed invention) stores barcode recognition data for conducting barcode pattern recognition processing. The barcode recognition processor uses this barcode recognition data to determine whether or not an image contains a barcode. Furthermore, when an image contains a barcode, the barcode recognition processor acquires the recognition data (recognition result data) contained in the barcode.

The generator of image data for saving (i.e., an example of a recording unit of the claimed invention) generates image data for saving by applying the recognition data acquired by the barcode recognition processor as the filename of the generated color image data, and then saves this image data for saving to the hard disk memory 24.

The operation panel 22 is a user interface for operating the multi-function device 20, and is provided with a touch panel or operation buttons. The operation buttons are used by a user to supply various input, and for example include a start button that issues a command to start a process. The touch panel displays interface elements such as selection buttons for selecting various functions and configuration buttons for configuring various functions. User commands corresponding to selected buttons are supplied to the controller 21.

The scanner 23 executes scanning functions to optically read an image. More specifically, the scanner 23 is provided with a light source, an imaging element (such as a CCD sensor), and a color separator such as filters or a prism. The scanner 23 irradiates a subject document placed on a scanning surface with light from the light source, and then uses the color separator and the imaging element to acquire per-color (RGB) electrical signals corresponding to the reflected light. Subsequently, the scanner 23 supplies to the controller 21, the electrical signals obtained by scanning the entire surface of the subject document.

The hard disk memory 24 is used to record a variety of data. In the present embodiment, the hard disk memory 24 temporarily stores the RAW data and the generated image data for saving. It should be appreciated that this hard disk memory 24 has sufficient storage capacity to store the RAW data, such data being typically large.

The multi-function device 20 is also connected to a computer terminal (not shown in the drawings) via a network. The computer terminal is provided with an output unit such as a display, as well as input units such as a keyboard and a pointing device. Additionally, the computer terminal acquires the image data for saving generated in the multi-function device 20, and displays an image based on this image data for saving, and saves or conducts other processes on the image data for saving.

The process whereby image data is generated using a multi-function device 20 configured as described above will now be described with reference to FIG. 2. Herein, the subject to be digitized is a document containing a barcode and a color image. The barcode contains identification data for identifying the image data. In the present embodiment, image data for saving is generated from the color image data acquired from the subject document and then saved, the identification data being applied as the filename thereof.

In the multi-function device 20, the touch panel of the operation panel 22 displays selection buttons for selecting various functions (such as scanner functions, printer functions, fax functions, and copy functions). The user first places the subject to be digitized on the scanning surface of the multi-function device 20, and then selects the scanner function by using the selection buttons displayed on the touch panel. Subsequently, the user selects the start button on the operation panel 22. In so doing, the controller 21 of the multi-function device 20 detects the commencement of scanning function processing, and then controls the scanner 23 to scan the document placed on the scanning surface (step S1-1). More specifically, the scanner 23 irradiates the subject with light from the light source. Subsequently, the scanner 23 acquires per-color (RGB) electrical signals from the reflected light by using the imaging element and the color separator, and then supplies these electrical signals to the controller 21. The RAW data generator of the controller 21 accumulates the acquired R, G, and B electrical signals, and generates RAW data from the electrical signals acquired from the entire document.

The RAW data generator of the controller 21 records and saves the generated RAW data to the hard disk memory 24 of the multi-function device 20 (step S1-2).

Next, the controller 21 executes color/monochrome conversion processing (step S1-3). In this color/monochrome conversion processing, the controller 21 performs both monochrome image data generation processing and color image data generation processing. More specifically, the monochrome image data generator of the controller 21 converts the RAW data recorded in the hard disk memory 24 to generate monochrome image data in TIFF format, and records this TIFF data in the RAM of the controller 21. The color image data generator of the controller 21 compresses and converts the RAW data recorded in the hard disk memory 24 to generate color image data in JPEG format, and records this JPEG data in the RAM of the controller 21. Upon generating the monochrome image data and the color image data, the controller 21 deletes the RAW data from the hard disk memory 24.

Next, the controller 21 performs barcode recognition processing (step S1-4). More specifically, the barcode recognition processor of the controller 21 conducts well-known barcode pattern recognition using the generated monochrome image data, and determines whether or not the acquired monochrome image data contains a barcode. When the monochrome image data contains a barcode, the barcode recognition processor acquires the code data (recognition result data) contained in the barcode, and then records this recognition result data in the RAM of the controller 21.

Next, the controller 21 generates image data for saving (step S1-5). More specifically, the generator of image data for saving of the controller 21 generates image data for saving, wherein the recognition result data recorded by the barcode recognition processor is associated as the filename with the color image data generated by the color image data generator. This image data for saving is then recorded in the hard disk memory 24, thereby concluding the above image data generation processing.

Thereinafter, the multi-function device 20 receives an image data transmission request from the computer terminal. This transmission request includes identification data for specifying the image data. The multi-function device 20 then acquires from the hard disk memory 24 the image data for saving whose filename matches the acquired identification data, and transmits this image data for saving to the computer terminal which has sent the request. The computer terminal then displays a color image based on the acquired image data for saving on the display. The user views the displayed color image, and is able to issue commands to start a certain process or save commands using the keyboard and pointing device.

As a result of the present embodiment, advantages such as the following are obtained:

(1) In the present embodiment, upon detecting the commencement of scanning function processing, the controller 21 of the multi-function device 20 scans a subject document to generate RAW data (step S1-1). The controller 21 then performs color/monochrome conversion processing (step S1-3), thereby generating both monochrome image data and color image data from the RAW data. Next, the controller 21 acquires recognition result data from the generated monochrome image data by performing barcode recognition processing (step S1-4), and then executes processing for generation of image data for saving, this image data for saving including the recognition result data and the color image data (step S1-5). In order to do so, the recognition result data is acquired from the monochrome image generated from the original image data. The monochrome image generated from the original image data has sharply-defined edges compared to a monochrome image generated from the color image. Consequently, the recognition result data acquired from the generated monochrome image may be recognized at a higher rate. Thus, the recognition result data can be more accurately associated with the color image data. In addition, the controller 21 generates both the monochrome image data and the color image data from a single scan. Thus, recognition result data can be acquired more accurately and more efficiently.

(2) In the present embodiment, the controller 21 generates image data for saving, wherein the acquired recognition result data is associated as a filename with the color image data (step S1-5). In this way, since recognition result data can be associated with color image data without human intervention, recognition result data can be associated with color image data more accurately.

In addition, the foregoing embodiment may also be modified as shown in the following:

(a) In the foregoing embodiment, the subject document containing the content to be digitized is a printed sheet of paper. However, the invention is not limited thereto, and the content from which image data is generated may also be recorded upon a three-dimensional object such as a bottle. For example, image data may be generated from a label affixed to a bottle.

(b) In the foregoing embodiment, the monochrome image is not limited to black-and-white images. For example, one of the single-color images from the R, G, and B signals that are color-separated in the scanner 23 may be used as the monochrome image. In addition, it is also possible to use a single-color image generated by combining the R, G, and B colors according to a predetermined standard.

Figure 2:
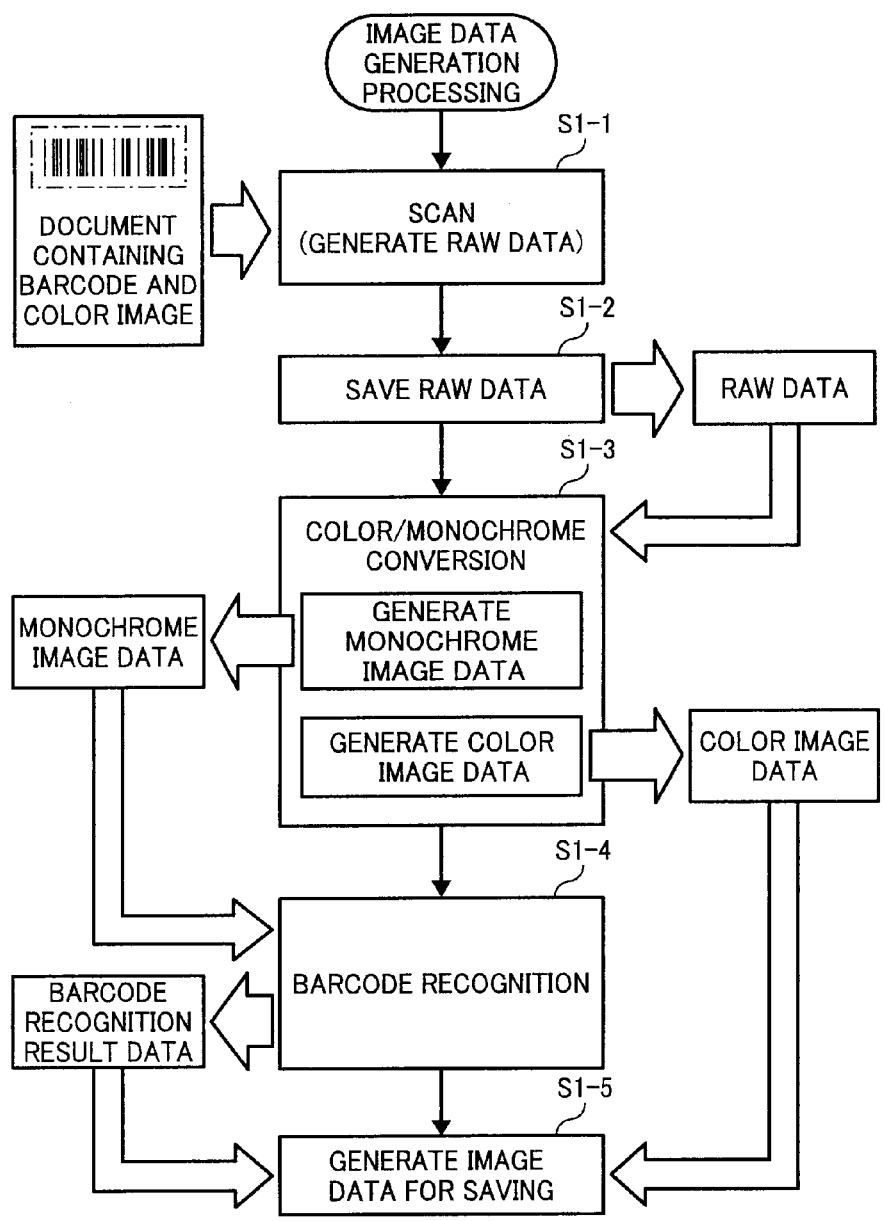
FIG. 2 is a flowchart explaining the procedure for image data generation processing.

(c) In the foregoing embodiment, as shown in FIG. 2, recognition result data is acquired from a one-dimensional barcode contained in the original. However, the invention is not limited thereto, and a two-dimensional barcode may be used in place of a one-dimensional barcode. In addition, the recognition result data is not limited to that acquired by barcode recognition processing, and may be acquired by optical character recognition (OCR) processing or optical mark recognition (OMR) processing. In the case of optical character recognition, the user may also be prompted to specify the portion of the subject document whereupon optical character recognition is to be conducted before the commencement of scanning function processing. In so doing, the characters appearing at the same position on the subject document are acquired as identification data, and this identification data can be associated with the color image data. Also, in the case of optical mark recognition, the positions of the darkly-shaded portions on a mark sheet or other document are recognized, and data in accordance with these recognition results is acquired.

(d) In the foregoing embodiment, the generator of image data for saving in the controller 21 associates the barcode recognition result data acquired from the monochrome image data as the filename of the color image data. However, the invention is not limited thereto, and the recognition result data may also be associated with the color image data as category data or identification data for archival purposes, for example.

(e) In the foregoing embodiment, the scanner 23 of the multi-function device 20 scans an original to generate RAW data. However, the invention is not limited thereto. For example, if RAW data has been recorded in a digital camera, it is possible to use a computer terminal capable of acquiring the RAW data as the image data generating device. More specifically, the controller of this computer terminal is made to function as such by executing RAW data acquisition processing, color/monochrome conversion processing using the acquired RAW data (step S1-3), barcode recognition processing (step S1-4), and processing to generate image data for saving (step S1-5).

(f) In the foregoing embodiment, the controller 21, as part of the processing to generate image data for saving (step S1-5), records the generated image data for saving to the hard disk memory 24. However, the invention is not limited thereto, and the controller 21 may also transmit the generated image data for saving to a computer terminal specified in advance by the user, the image data for saving being saved in the specified computer terminal.

(g) In the foregoing embodiment, the multi-function device 20 was described as the image data generating device. However, the invention is not limited thereto, and the image data generating device may also be a scanning device having only scanning functions, or a digital camera capable of generating image.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2007-160261 filed on Jun. 18, 2007 and including specification, claims, drawings and summary. The disclosure of the above Japanese Patent Application is incorporated herein by reference in its entirety.

What is claimed is:

1. An image data generating device, comprising:
an original image acquirer that acquires original image data of a subject; and
a controller that generates image data;
the controller including
a monochrome image data generator that generates monochrome image data from the original image data,
a color image data generator that generates color image data from the original image data,
a text data acquirer that acquires recognition result data from the monochrome image data generated by the monochrome image data generator, and
a recording unit that associates and records the color image data generated by the color image data generator and the recognition result data acquired by the text data acquirer,
wherein the text data acquirer acquires the recognition result data from the monochrome image data by a barcode recognition processing.

2. The image data generating device according to claim 1, wherein the original image acquirer includes a scanner controller that scans a subject while at the same time converting reflected light from the subject into an electrical signal, the scanner controller generating the original image data from the electrical signal.

3. The image data generating device according to claim 1, wherein the recording unit generates and records image data for saving that includes both the recognition result data acquired by the text data acquirer and the color image data generated by the color image data generator.

4. An image data generating method for generating image data, using an image data generating device having an original image acquirer that acquires original image data of a subject, and a controller including a monochrome image data generator, a color image data generator, a text data acquirer, and a recording unit, the method comprising:
the monochrome image data generator generating monochrome image data from the original image data;
the color image data generator generating color image data from the original image data;
the text data acquirer acquiring recognition result data from the monochrome image data generated by the monochrome image data generator; and
the recording unit associating and recording the color image data generated by the color image data generator and the recognition result data acquired by the text data acquirer,
wherein the text data acquirer acquires the recognition result data from the monochrome image data by a barcode recognition processing.

5. A non-transitory computer-readable storage medium that stores a program for causing a computer to function as an original image acquirer that acquires original image data of a subject, and as a controller, the program for causing the controller to function as:
a monochrome image data generator that generates monochrome image data from the original image data,
a color image data generator that generates color image data from the original image data, a text data acquirer that acquires recognition result data from the monochrome image data generated by the monochrome image data generator, and a recording unit that associates and records the color image data generated by the color image data generator and the recognition result data acquired by the text data acquirer, wherein the text data acquirer acquires the recognition result data from the monochrome image data by a barcode recognition processing.

* * * * *